(12) United States Patent
Superka et al.

(10) Patent No.: US 7,303,794 B2
(45) Date of Patent: Dec. 4, 2007

(54) INK JET RECORDING PAPER

(75) Inventors: Annmarie Superka, Allentown, PA (US); Kevin Jay Roth, Bethlehem, PA (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 590 days.

(21) Appl. No.: 10/813,772

(22) Filed: Mar. 31, 2004

(65) Prior Publication Data

US 2005/0221026 A1    Oct. 6, 2005

(51) Int. Cl.
*C01F 11/18* (2006.01)
*B41M 5/52* (2006.01)
*B05D 7/10* (2006.01)

(52) U.S. Cl. .................... 428/32.37; 423/432; 427/212

(58) Field of Classification Search ............. 423/419.1, 423/430, 432; 428/32.34, 32.37; 427/212
See application file for complete search history.

(56) References Cited

U.S. PATENT DOCUMENTS

| | | | |
|---|---|---|---|
| 4,175,066 A | 11/1979 | Shibazaki et al. | |
| 4,517,098 A | 5/1985 | Hann et al. | |
| 4,610,801 A | 9/1986 | Matthews et al. | |
| 4,711,727 A | 12/1987 | Matthews et al. | |
| 5,076,846 A | 12/1991 | Buri et al. | |
| 5,176,797 A | 1/1993 | Hartan et al. | |
| 5,336,727 A | 8/1994 | Okazawa et al. | |
| 5,783,038 A * | 7/1998 | Donigian et al. | 162/135 |
| 5,905,110 A | 5/1999 | Grondin et al. | |
| 6,086,987 A | 7/2000 | Yamanaka et al. | |
| 6,402,824 B1 | 6/2002 | Freeman et al. | |
| RE38,301 E | 11/2003 | Bleakley et al. | |
| 6,667,093 B2 | 12/2003 | Yuan et al. | |
| 2003/0045647 A1 | 3/2003 | Suau et al. | |

FOREIGN PATENT DOCUMENTS

JP   HEI 09-194669    7/1997

* cited by examiner

*Primary Examiner*—Wayne A. Langel
*Assistant Examiner*—James Fiorito
(74) *Attorney, Agent, or Firm*—Leon Nigohosian, Jr.; Derek S. Jessen

(57) ABSTRACT

A thermal ink jet recording paper, incorporating dewatered and milled precipitated calcium carbonate ("PCC") is disclosed. Precipitated calcium carbonate is dewatered and milled in the presence of an amphoteric or anionic dispersant to produce a high solids PCC composition.

When used in coating formulations the PCC has a surface morphology and chemistry that enhances the printability of ink jet paper. Ink jet recording paper incorporating the PCC of the present invention has reduced ink feathering and spreading as well as improved optical density, dry time, and water fastness.

21 Claims, No Drawings

INK JET RECORDING PAPER

FIELD OF THE INVENTION

The present invention relates to milled precipitated calcium carbonate (PCC) pigments for use in ink jet recording paper. More particularly, the present invention relates to an ink jet recording paper which incorporates such pigments to impart enhanced print quality. The invention further relates to methods of producing milled PCC and to the application of the milled PCC to ink jet recording paper.

BACKGROUND OF THE INVENTION

The thermal ink jet process applies a dilute aqueous ink onto the surface of a paper by heating a small volume of the ink in a small chamber with an orifice that is directed at the recording paper. The small volume of ink that is heated rapidly reaches its boiling point, and the steam bubble formed propels a tiny drop of liquid ink at the paper, where the drop produces a single dot in a dot matrix that forms a character or image on the sheet. This process requires an ink that is low in solids and high boiling components so that it is capable of boiling rapidly without leaving a residue that can foul the heating element, and clog the orifice. Therefore, up to ninety-six (96) percent by weight of ink jet printer ink is a mixture of water and low molecular weight glycols. Although such an ink boils quickly when heated to ensure rapid printing, and is not prone to clog, it results in an applied ink that is very mobile and slow to dry. Therefore, good print quality can be obtained only if the ink colorant or dye remains on or near the outer surface of the paper, and does not spread or move from the point at which it was applied.

It is also important that drying occurs rapidly to prevent smearing of the colorant. In printers that are not equipped with heating elements, the water and glycol components of the ink must penetrate into the body of the paper for proper drying of the colorant on the surface. If the colored phase is carried into the paper with the liquid phase as it penetrates into the paper, or if the colorant migrates across the surface of the paper, the quality of the resulting print or image will be poor. Also, dry ink colorant that is not permanently fixed on the paper will blot or run if the printed surface becomes wet or is marked with a highlighter. Therefore, the dry ink should have excellent water and highlighter fastness properties for optimum performance.

In most applications, multipurpose office papers provide inadequate or poor thermal ink jet print quality. This is particularly true where multicolor printing with concomitant superimposed ink applications is utilized. The poor print quality is compounded in printers that apply the colors in one order when the print head moves to the right and the reverse order when the print head moves to the left. Multipurpose office papers often allow the colorant to penetrate into the paper, which results in reduced optical density of the printed image, and increased show through on the reverse side of the paper. Multipurpose office papers that are highly sized prevent liquid penetration, leading to higher ink optical density, but, also, excessive feathering and spreading.

One method of improving thermal ink jet print quality is to apply a material to the paper surface that binds the ink colorant to the surface, but allows the water/glycol liquid phase to pass into the body of the paper, which speeds drying. However, the ink colorant often is an unsaturated or aromatic organic compound, and if the surface material interacts too strongly with the colorant the color of the ink can change.

Therefore, a surface material is sought that prevents the ink colorant from penetrating the paper, but does not interact so strongly as to effect the colorant, and cause a color change.

Other methods have used cationically charged pigments where it was thought these would be more interactive with ink jet dyes. However, these are generally low in solids, ten (10) to twenty (20) percent, and therefore there are application limitations, such as decreased production rates and lower coater speeds, due to the low solids concentration.

The present invention provides one solution to the problems associated with ink jet printing.

SUMMARY OF THE INVENTION

The present invention provides for an ink jet recording paper that incorporates milled precipitated calcium carbonate (PCC).

The milled PCC is prepared by adding a first amount of an organophosphonate compound to calcium hydroxide slurry followed by admixing an aluminum sulfate to the calcium hydroxide slurry. Carbonating the calcium hydroxide slurry to produce PCC slurry. Admixing a second amount of organophosphonate to the PCC slurry. The PCC slurry is then dewatered and treated with an amphoteric or anionic dispersant followed by milling the PCC slurry.

DETAILED DESCRIPTION OF THE INVENTION

An ink jet recording paper has been produced that provides full color ink jet print quality. The selection of precipitated calcium carbonate (PCC) particle size, surface area, surface chemistry, and degree of aggregation allows each thermal ink jet print characteristic to be individually adjusted and optimized.

The PCC for ink jet recording paper of the present invention is produced wherein calcium oxide is admixed with water to produce a calcium hydroxide slurry. To the calcium hydroxide slurry a first amount of an organophosphonate is added. The calcium hydroxide slurry is then admixed with aluminum sulfate prior to introducing carbon dioxide into the calcium hydroxide slurry. Thus converting the calcium hydroxide to precipitated calcium carbonate (PCC). A second amount of organophosphonate is then added to the PCC slurry followed by screening and dewatering the PCC slurry forming a concentrated PCC composition. An amphoteric or anionic dispersant is then added to the concentrated PCC composition which is milled producing the milled PCC composition for use in ink jet coating formulations.

PCC Preparation

Admix calcium oxide with water to produce a calcium hydroxide slurry. Adjust the calcium hydroxide slurry temperature from about 65 degrees Celsius to about 75 degrees Celsius to about 10 degrees Celsius to about 14 degrees Celsius. Admix from about 0.04 percent by weight to about 0.15 percent by weight calcium hydroxide of an organophosphonate to the calcium hydroxide slurry. Admix from about 2.5 percent to about 4.5 percent by weight calcium hydroxide an aluminum sulfate to the calcium hydroxide slurry. Reduce the temperature of the calcium hydroxide slurry from about 10 degrees Celsius to about 14 degrees Celsius to about 6 degrees Celsius to about 7 degrees Celsius. Add carbon dioxide to the calcium hydroxide slurry until the calcium hydroxide slurry is converted to calcium carbonate (PCC) slurry. Admix from about 0.5 percent by weight PCC to about 1.5 percent by weight PCC an organophosphonate with the precipitated calcium carbonate (PCC) slurry. A phosphoric acid is added at a concentration of from about 0.2 by weight PCC to about 0.5 by weight PCC to the PCC slurry to stabilize and maintain the surface area of the PCC product. The PCC slurry is then screened and dewatered to from about 25 percent to about 65 percent by weight PCC to produce a concentrated PCC composition. The PCC composition is admixed with from about 1.0 percent active dispersant by weight PCC to about 5.0 percent active dispersant by weight PCC of an amphoteric or anionic dispersant prior to being milled. To obtain the desired application viscosity, the dispersant level may exceed upwards of from about 8.0 percent active dispersant by weight PCC to about 10.0 percent active dispersant by weight PCC.

The PCC produced according to the present invention has a surface area of from about 60 meters squared per gram ($m^2/g$) to about 100 $m^2/g$ and a solids concentration of about 10 percent by weight PCC. After the completion of carbonation a second amount of organophosphonate in an amount of from about 0.60 percent by weight PCC to about 0.75 percent by weight PCC is added to the PCC slurry and agitated to a pH of from about 7.0 to about 8.0. The PCC slurry is then screened, dewatered and milled in the presence of a dispersant to obtain the milled PCC having the characteristics of the present invention's high-quality, low cost ink jet recording paper.

Dewatering can be carried out using technology known in the art to include, but not limited to, centrifugation, filter press such as plate and frame press, Larox press, Andritz press, belt press, tube press, vacuum, or other known dewatering technology.

Milling of the PCC may be carried out in either a wet or dry milling process, for example, a conventional ball mill, jet mill, micro mill, Cowles type dispersion mixer, kady mill, impingement type mill, sand or media mill. Milling can be carried out by introducing concentrated slurry of PCC into a media mill containing glass media of a size from about 0.7 mm to about 0.9 mm. The media mill is equipped with mechanical agitation, and the resulting weight percent solids of the PCC slurry is from about 25 to about 65 percent based on the total weight of the PCC and the water. When media milling is performed on the PCC of the present invention, the specific surface area is from about 50 meters squared per gram ($m^2/g$) to about 120 $m^2/g$, or from about 60 $m^2/g$ to about 100 $m^2/g$. Milling is performed on the PCC of the present invention to a target Brookfield viscosity of from about 200 centipoise (cps) to about 2000 cps at 100 revolutions per minute (rpm) using the appropriate spindle.

The Organophosphonates

The organophosphonates employed in the present invention are organopolyphosphonates of varying molecular weights commonly used as scale inhibitors, sequesterants, dispersants, deflocculants, and detergent promoters. Such organophosphonates include, but are not limited to, nitrilotris-(methylene phosphonic acid), ethylenediaminetetra (methylene phosphonic acid), diethylenetriaminepenta (methylene phosphonic acid), hydroxy ethane-1,1-diphosphonic acid, ethanolamine, ethanolamine bis-(methylenephosphonic acid), N-dimethylene phosphonic acid, and hexamethylenediaminetetra (methylene phosphonic acid). A useful organophosphonate is ethanolamine bis-(methylenephosphonic acid). The organophosphonates that are useful in the present invention can be any organophosphonates that are known and available in the art.

When the first organophosphonate is admixed with the calcium hydroxide slurry, the range is from about 0.04 percent by weight calcium hydroxide slurry to about 0.15 percent by weight calcium hydroxide slurry, or from about 0.08 percent by weight calcium hydroxide slurry to about 0.12 percent by weight calcium hydroxide.

When the second organophosphonate is admixed with the PCC slurry, the range is from about 0.50 percent weight PCC slurry to about 1.0 percent weight PCC slurry, or from about 0.60 percent by weight PCC slurry to about 0.75 percent by weight PCC slurry.

The Aluminum Sulfate

The aluminum sulfate can be any aluminum sulfate known and available in the art. When the aluminum sulfate is admixed with the calcium hydroxide slurry, the range is from about 2.5 percent by weight calcium hydroxide slurry to about 4.5 percent by weight calcium hydroxide slurry or from about 2.8 percent by weight calcium hydroxide slurry to about 4.0 percent by weight calcium hydroxide slurry.

The process of the present invention to this point is essentially that of U.S. Pat. Nos. 4,367,207, 4,892,590, and 5,783,038, the teachings of which are incorporated herein by reference.

The Amphoteric Dispersant

The amphoteric dispersant of the present invention is selected from the group consisting of sodium salts of co-polymers of acrylic acid and diallyldimethylammonium chloride (DMDAAC). They may also be selected from the group consisting of sodium salts of co-polymers of acrylic acid and methyl chloride quaternaryamine of dimethylaminoethylacrylate (DMAEA: quaternaryamine). They may further be selected from the group consisting of an acrylic acid (AA) and an DMDAAC:quaternaryamine copolymer. The amphoteric dispersants useful in the present invention having a molecular weight ranging from about 2000 to about 10000 or from about 2000 to about 6000 as determined by intrinsic viscosity method.

When the amphoteric dispersant is admixed with the PCC slurry, the range is from about 1.0 percent active dispersant by weight PCC to about 5.0 percent active dispersant by weight PCC or from about 2.0 percent active dispersant by weight PCC to about 3.5 percent active dispersant by weight PCC.

The Anionic Dispersant

The anionic dispersants useful in the present invention are selected from sodium polyacrylates having a molecular weight ranging from about 2000 to about 10000 or from about 2000 to about 6000 as determined by intrinsic viscosity method. Some commercially available dispersants that work in the present invention include Colloids 207, 211, 220 and 260 from Kemira Chemicals, Inc. 245 Town Park Drive, Suite 200, Kennesaw, Ga. 30144; Acumer 9300 from Rohm & Haas Company 100 Independence Mall West, Philadelphia, Pa. 19106-2399; and Sokalan HP-80 from BASF Corporation Function Polymers, 11501 Steele Creek Rd., Charlotte, N.C. 28273. Also, the anionic dispersant can be a copolymer of acrylic and maleic acids.

When the anionic dispersant is admixed with the PCC slurry, the range is from about 1.0 percent active dispersant by weight PCC to about 5.0 percent active dispersant by weight PCC or from about 2.0 percent active dispersant by weight PCC to about 3.5 percent active dispersant by weight PCC.

In the present invention, screening of the PCC starts by ending the reaction of carbon dioxide and calcium hydroxide when the conductivity of the slurry reaches a minimum, which is typically at a pH of from about 7 to about 8. Organophosphonate at a concentration of up to about 1.5 percent by weight of PCC is added to control surface area of the final product. Other chemical agents that are surface active with regard to calcium carbonate will also serve as well as organophosphonates to control the surface area of the final product. Such agents include, but are not limited to the following, sodium polyphosphates, sodium silicates, sodium polyacrylates, various carboxylic acids, such as mono, di, tri and polycarboxylic acids, and their salts, various polysaccharides, and various gums with repeating carboxylic acid functionalities.

Ink jet recording papers incorporating the PCC of the present invention have been prepared. The following is a summary of the procedures and testing methods used. Once the PCC of the present invention is produced, the entire testing process can be categorized into four areas; pigment preparation, formulation with binder, paper coating and processing, and testing. Specific details for each of these procedures are given below.

Pigment Preparation

Pigments to be tested are typically in the form of a slurry or a filter cake. Samples in the form of a slurry are concentrated to the desired solids by vacuum filtration. In some instances, such as with a media milled PCC with a specific surface area of about 60 $m^2/g$ to 100 $m^2/g$, the slurry solids are not further altered in order to duplicate trial conditions. Once the target formulation solids is set, the pigment is diluted, if necessary, with water and thoroughly mixed. The pigment is characterized by specific surface area (Flowsorb), solids concentration, surface charge and viscosity (Brookfield).

The surface area of the product was obtained by using a Micromeritics Flowsorb II 2300, which employs BET theory with nitrogen as the absorbing gas. Surface charge of the product was determined using Doppler Electrophoretic Light Scattering Analysis (DELSA).

Coating Formulation

Typical binders include starch, polyvinyl alcohol (PVOH), polyvinyl acetate and latex. These can be used as the sole binder or blended with other binders as is known in the art. When a starch is used as a binder, the dry starch is dispersed in water at from about 10 to about 35 percent solids, and then cooked in an automated laboratory cooker at about 195 degrees Celsius for about 50 minutes to about 190 minutes. The resulting viscous starch slurry is combined with the pigment, which has been appropriately prepared to attain the target coating formulation solids, and mixed thoroughly on a Premier mill with a Cowles type open impeller blade. The formulation is mixed for about 5 minutes until a completely homogenous slurry is obtained, and the resulting coating formulation is characterized by Brookfield viscosity (10, 20, 50 and 100 rpm) and solids.

Dry polyvinyl alcohol is prepared in a manner similar to that used for starch. The PVOH is hydrated at about 200 degrees Celsius in a laboratory cooker for from about 50 minutes to about 190 minutes at about from 10 percent solids to about 25 percent solids. For the latex binder (50 percent solids), liquid PVOH or polyvinyl acetate, no preparation is necessary before testing. The formulation of these binders with the pigment is the same as with the starch.

Coating formulation solids for the tests were in the range of from about 20 percent solids by weight to about 50 percent solids by weight, with a typical coating formulation having from about 30 percent solids by weight to about 45 percent solids by weight.

Binders

Examples of binders useful for coating compositions for ink jet recording paper are those heretofore conventionally used in the art, and include PVOH and derivatives thereof, oxidized starch, esterified starch, dextrin and like starches, carboxymethylcellulose, hydroxyethylcellulose and like cellulose derivatives, casein, gelatin, soybean protein, maleic anhydride resin, lattices of usual styrenebutadiene copolymer, methyl methacrylate-butadiene copolymer and like conjugated diene polymers or copolymers, and lattices or acrylate and methacrylate polymers or copolymers and like acrylic polymers, and latex. When required, the coating composition may have further incorporated therein in an amount conventionally used in the art of conventional pigment dispersants, tackifiers, flowability modifiers, defoaming agents, foaming inhibitors, release agents, coloring agents, and the like.

Paper Coating

Generally, an unsized base stock of about 81.3 grams per meter squared ($g/m^2$) to about 83.0 $g/m^2$ basis weight is used in the tests. The paper is cut into 12 inch×17 inch sheets and secured to the CSD Drawdown Apparatus, manufactured by CSD Tech International, Inc., of Oldsmar, Fla., which consists of a glass plate (12 inch×17 inch) mounted on metal base with spring clip at the top. A coating formulation is applied with a CSD drawdown rod by placing the rod of choice, which depends on target coat weight, at the top of the paper, adding a uniform line of coating formulation across the top of the paper, below the rod, and coating the paper by pulling the drawdown rod from top to bottom using light pressure and a constant, steady rate for about 2 seconds.

The coat weight is determined by the stainless steel drawdown rods, which are specifically grooved to deliver a predetermined coating volume to the paper surface. Rods with fewer grooves deliver a heavier coat weight, since the spaces between the grooves is wider. In turn, rods with a greater number of more tightly spaced grooves produce lighter coat weights. Typical coat weights are from about 2 grams per meter squared ($g/m^2$) to about 12 $g/m^2$.

Once a coating formulation has been applied, the paper is immediately dried with a hand held heat gun for from about 30 seconds to about 60 seconds, and then completely dried and conditioned in a constant temperature and humidity environment over a period of about 24 hours. The conditioned papers are then cut into 8½×11 inch sheets for testing.

The coating formulation of the present invention can be applied to paper basestock using any paper coater known in the art such as a rod coater, blade coater, airknife, metersize press, size press, curtain coater or cast coater.

Paper Testing

Minimum ink jet print quality criteria have been established by Hewlett Packard Corporation ("HP"). Therefore, most tests utilize HP methods to determine the following print characteristics.

Optical density is a measure of the reflection density of an image. A specific test pattern is printed onto the paper, and the optical densities of pure black, composite black, cyan, magenta, and yellow are measured using a reflection densitometer (Macbeth RD918). The resulting optical densities are compared to minimum HP specifications.

Ink spreading and feathering can both decrease the quality of ink jet print. Ink spreading is defined as the growth or widening of printed areas. Feathering is the wicking of ink, which results in fuzzy images. This is measured by analyzing a specific portion of the same printed pattern used for optical density measurements. The specific portion is evaluated for ink area, spreading, and ink perimeters, feathering. The resulting, digitized pattern is quantitated and compared to a commercial premium ink jet paper. The HP test method for ink spreading and feathering was not used in these tests, since the HP test is subjective rather than quantitative.

Ink Dry Time is a measure of the rate of ink absorption into a sheet of paper. A specific test pattern is printed, the image is blotted, and the resulting optical density of the transferred black ink is measured. The results are fitted to a decaying exponential model from HP, and the ink dry time is calculated. The final dry times are compared to minimum criteria set by HP.

Waterfastness is a measure of the amount of colorant transferred from a printed area to an unprinted area when water is applied. The waterfastness test pattern is printed onto the paper, 250 microliter (μm) of water is applied across the print, and allowed to run over the printed area and adjacent unprinted area. The optical density of the transferred black ink on the unprinted areas is measured. Resulting optical densities are compared to HP standards.

In the brightness test, the coated paper is tested for TAPPI brightness using the Technidyne S-4 brightness meters. Results are compared to the uncoated base stock.

Other Ink Jet Media

The present invention also relates to the use of the PCC pigment in ink jet coating formulations that are particularly useful in paperboard transparency, fabric, and tee-shirt iron-ons. The PCC for use in these applications is prepared according to the process of the present invention for the preparation of the ink jet coating formulation.

EXAMPLES

The following non-limiting examples are merely illustrative embodiments of the present invention and are not to be construed as limiting the invention, the scope of which is defined by the appended claims.

Example 1

Calcium oxide with water was admixed in a portec slaker producing a calcium hydroxide slurry having a percent rapid slake of at least 90 percent as measured by methyl orange (MO) titration.

The calcium hydroxide slurry was transferred to a reaction vessel and the temperature adjusted to about 12 degrees Celsius, at which time 0.12 percent by weight organophosphonate (Briquest 221-50A) was admixed with the calcium hydroxide slurry followed by 3.7 percent by weight aluminum sulfate. The temperature was lowered to 6.5 degrees Celsius. Carbon dioxide was added until conductivity reached a minimum, about 35 minutes, indicating the calcium hydroxide slurry had been converted to calcium carbonate slurry. Carbonation was continued for an additional 5 minutes before being shut off and the material agitated for an additional 10 minutes producing about a 10 percent solids PCC slurry with a pH of about 7.0 to about 8.0. At this point about 0.6 percent by weight organophosphonate (Briquest 221-50A) was added to the PCC slurry followed by 0.3 percent by weight PCC of phosphoric acid.

The PCC slurry was screened at 325 mesh and dewatered through centrifugation. The PCC composition was treated with dispersant and then processed using a Kady mill to produce a dispersed PCC composition that is about 35 percent solids to about 45 percent solids concentration. The composition has a Brookfield viscosity of from about 500 centipoise to about 1000 centipoise as measured at 100 rpm with the appropriate spindle. The PCC particles have a specific surface area of from about 85 $m^2/g$ to about 100 $m^2/g$ and a surface charge of from about –(negative) 30 millivolt (mV) to about +5 mV dependant upon the dispersant chemistry employed.

Example 2

Calcium carbonate was produced in the same manner as that described in Example 1.

The milled PCC was evaluated in coating formulations using six amphoteric and/or anionic dispersants with an uncoated paper basestock. Each PCC composition was formulated into an ink jet coating with 7 parts polyvinyl alcohol per 100 parts PCC. Paper samples were coated with from about 5 g/m to about 7 $g/m^2$. After drying, hand drawdowns were tested for optical density and color bleed evaluations. The results of these tests are given in Table 1.

TABLE 1

| Ink Spreading and Feathering | Black (optical density) | Cyan (optical density) | Magenta (optical density) | Yellow (optical density) | Sample |
|---|---|---|---|---|---|
| 100.518 | 1.52 | 1.40 | 1.31 | 1.28 | 1 |
| 99.974 | 1.60 | 1.39 | 1.28 | 1.24 | 2 |
| 101.083 | 1.44 | 1.51 | 1.41 | 1.28 | 3 |
| 100.744 | 1.39 | 1.42 | 1.27 | 1.26 | 4 |
| 101.212 | 1.44 | 1.50 | 1.41 | 1.28 | 5 |
| 101.059 | 1.42 | 1.52 | 1.39 | 1.29 | 6 |
| 104.600 | 1.36 | 1.17 | 1.16 | 1.11 | *Control |

*uncoated basestock

The present invention provides for lower ink spreading and feathering (lower numbers are better) while maintaining optical density when compared with an uncoated basestock.

Example 3

Calcium carbonate was produced in the same manner as that described in Example 1. The milled precipitated calcium carbonate (PCC) was formulated into an ink jet coating and paper samples were coated with from about 5 $g/m^2$ to about 7 $g/m^2$ of the coating formulation.

After drying, hand drawdowns were tested for optical density and color bleed evaluations. The results of these tests are given in Table 2.

TABLE 2

| Ink Spreading and Feathering | Black (optical density) | Cyan (optical density) | Magenta (optical density) | Yellow (optical density) | Binder |
|---|---|---|---|---|---|
| 101.84 | 1.41 | 1.48 | 1.39 | 1.27 | Starch 30 |
| 100.974 | 1.67 | 1.56 | 1.38 | 1.24 | PVOH 7 |
| 101.521 | 1.53 | 1.51 | 1.39 | 1.27 | Starch 15 and PVOH 4 |
| 104.600 | 1.36 | 1.17 | 1.16 | 1.11 | uncoated basestock |

The results indicate that a range of binders can be used with the PCC of the present invention to provide for lower ink spreading and feathering (lower numbers are better) while maintaining superior optical density to that of the uncoated basestock.

While it is apparent that the invention disclosed herein is well calculated to fulfill the objects stated above, it will be appreciated that numerous modifications and embodiments may be devised by those skilled in the art. Therefore, it is intended that the appended claims over all such modifications and embodiments fall within the scope of the present invention.

We claim:

1. A method for producing a precipitated calcium carbonate for ink jet recording paper comprising:
   a) admixing calcium oxide with water to produce a calcium hydroxide slurry;
   b) admixing a first amount of an organophosphonate followed by adding aluminum sulfate to the calcium hydroxide slurry;
   c) introducing carbon dioxide to the calcium hydroxide slurry to produce a precipitated calcium carbonate slurry;
   d) adding a second amount of organophosphonate to the precipitated calcium carbonate slurry;
   e) admixing phosphoric acid to the precipitated calcium carbonate slurry;
   f) screening and dewatering the calcium carbonate slurry; and
   g) milling the screened and dewatered precipitated calcium carbonate in the presence of an amphoteric or anionic dispersant after step (d), to produce a precipitated calcium carbonate product.

2. The method of claim 1 wherein the first organophosphonate is selected from the group consisting of nitrilo-tris-(methylene phosphonic acid), ethylenediaminetetra (methylene phosphonic acid), diethylenetriaminepenta (methylene phosphonic acid), hydroxy ethane-1,1-diphosphonic acid, ethanolamine, ethanolamine bis-(methylenephosphonic acid), N-dimethylene phosphonic acid, and hexamethylenediaminetetra (methylene phosphonic acid).

3. The method of claim 1 wherein the first amount of the organophosphonate is employed at a level of from about 0.04 percent by weight calcium hydroxide slurry to about 0.15 percent by weight calcium hydroxide slurry and wherein the aluminum sulfate is from about 2.5 percent by weight calcium hydroxide slurry to about 4.5 percent by weight calcium hydroxide slurry.

4. The method of claim 1 wherein the first organophosphonate is ethanolamine bis-(methylenephosphonic acid).

5. The method of claim 1 wherein the second organophosphonate is employed at a level of from about 0.50 percent weight PCC slurry to about 1.0 percent weight PCC slurry.

6. The method of claim 1 wherein the second organophosphonate is ethanolamine bis-(methylenephosphonic acid).

7. The method of claim 1 wherein the amphoteric dispersant is selected from the group consisting of sodium salts of co-polymers of acrylic acid and diallyldimethylammonium chloride.

8. The method of claim 7 wherein the amphoteric dispersant is employed at a level of from about 1.0 percent active dispersant by weight PCC to about 5.0 percent active dispersant by weight PCC.

9. The method of claim 7 wherein the amphoteric dispersant has a molecular weight ranging from about 2000 to about 10000.

10. The method of claim 1 wherein the anionic dispersant is from the group consisting of sodium polyacrylates and copolymers of acrylic maleic acids.

11. The method of claim 1 wherein the anionic dispersant is employed at a level of from about 1.0 percent active dispersant by weight PCC to about 5.0 percent active dispersant by weight PCC.

12. The method of claim 1 wherein the anionic dispersant has a molecular weight ranging from about 2000 to about 10000.

13. The method of claim 1 wherein the PCC produced is from about 25 percent solids to about 65 percent solids concentration viscosity of from about 500 centipoise to about 1000 centipoise specific surface area of from about 60 $m^2/g$ to about 100 $m^2/g$ and surface charge of from about −(negative) 30 millivolt (mV) to about +5 mV.

14. A method for producing a precipitated calcium carbonate for ink jet recording paper comprising:
   a) admixing calcium oxide with water to produce a calcium hydroxide slurry;
   b) admixing a first amount of an organophosphonate followed by adding aluminum sulfate to the calcium hydroxide slurry;
   c) introducing carbon dioxide to the calcium hydroxide slurry to produce a precipitated calcium carbonate slurry;
   d) adding a second amount of organophosphonate to the precipitated calcium carbonate slurry;
   e) admixing phosphoric acid to the precipitated calcium carbonate slurry;
   f) screening and dewatering the calcium carbonate slurry;
   g) milling the screened and dewatered precipitated calcium carbonate in the presence of an amphoteric or anionic dispersant after step (d), to produce a precipitated calcium carbonate product; and,
   h) coating at least one side of a paper base stock with a coating formulation comprising the milled precipitated calcium carbonate and binder to form the ink jet recording paper.

15. A method according to claim 1 wherein the milled PCC is used in ink jet coating formulations for paperboard transparency, fabric, and tee-shirt iron-ons.

16. The method of claim 1 wherein the amphoteric dispersant is selected from the group consisting of sodium salts of co-polymers of acrylic acid and methyl chloride quaternaryamine of dimethylaminoethylacrylate.

17. The method of claim 16 wherein the amphoteric dispersant is employed at a level of from about 1.0 percent active dispersant by weight PCC to about 5.0 percent active dispersant by weight PCC.

18. The method of claim 16 wherein the amphoteric dispersant has a molecular weight ranging from about 2000 to about 10000.

19. The method of claim 1 wherein the amphoteric dispersant is selected from the group consisting of an acrylic acid and a diallyldimethylammonium chloride quaternaryamine copolymer.

20. The method of claim 19 wherein the amphoteric dispersant is employed at a level of from about 1.0 percent active dispersant by weight PCC to about 5.0 percent active dispersant by weight PCC.

21. The method of claim 19 wherein the amphoteric dispersant has a molecular weight ranging from about 2000 to about 10000.

* * * * *